(12) United States Patent
Tormasi

(10) Patent No.: US 12,508,543 B2
(45) Date of Patent: Dec. 30, 2025

(54) SYSTEM FOR CAPTURING CARBON DIOXIDE AND OTHER GASES

(71) Applicant: Walter A. Tormasi, Martinsville, NJ (US)

(72) Inventor: Walter A. Tormasi, Martinsville, NJ (US)

(*) Notice: Subject to any disclaimer, the term of this patent is extended or adjusted under 35 U.S.C. 154(b) by 659 days.

(21) Appl. No.: 17/803,593

(22) Filed: Sep. 2, 2022

(65) Prior Publication Data

US 2023/0158450 A1  May 25, 2023

Related U.S. Application Data

(60) Provisional application No. 63/361,071, filed on Nov. 23, 2021.

(51) Int. Cl.
*B01D 53/62* (2006.01)
*B01D 53/14* (2006.01)
*B01D 53/76* (2006.01)

(52) U.S. Cl.
CPC ......... *B01D 53/62* (2013.01); *B01D 53/1412* (2013.01); *B01D 53/1493* (2013.01); *B01D 53/76* (2013.01); *B01D 2221/16* (2013.01); *B01D 2257/504* (2013.01); *B01D 2258/0283* (2013.01); *B01D 2259/10* (2013.01)

(58) Field of Classification Search
CPC ........ B01D 53/14; B01D 53/62; B01D 53/76; B01D 53/1412; B01D 53/1475; B01D 53/1493; B01D 53/18; B01D 53/77; B01D 53/78; B01D 53/228
See application file for complete search history.

(56) References Cited

U.S. PATENT DOCUMENTS 8,945,279 B2 *  2/2015  Aines .................... B01D 53/14
                                                        95/139

* cited by examiner

*Primary Examiner* — Sharon Pregler
(74) *Attorney, Agent, or Firm* — Arthur L. Lessler

(57) ABSTRACT

Disclosed are devices and methods for capturing carbon dioxide and other gases. All gas-capturing systems employ chemical fluid/media for binding purposes. One system delivers chemicals in droplet form, while another system delivers feed gas in bubble form. All systems employ an admixing chamber for confining and uniting particles of matter, as well as streaming means for placing gas in confinement. The droplet-based delivery system packetizes chemicals using an atomizing device, while the bubble-based delivery system packetizes gaseous feedstock using metering means, rerouting means, perturbation means, and stream-dividing means. The droplet and bubble systems feature common or unique advantages relating to chemical flow, surface area, and/or progressive cycling. These advantages increase the efficiency of gas-capturing devices in general and decarbonizing devices in particular.

8 Claims, 22 Drawing Sheets

TABLE OF SELECT SPHERE CHARACTERISTICS

| Volume of Sphere | Area of Sphere | Spheres Per Liter | Total Sphere Area Per Liter |
|---|---|---|---|
| 1000 cm$^3$ (1.0 L) | 483.59758620 cm$^2$ (0.048359759 m$^2$) | 1 | 483.59758620 cm$^2$ (0.048359759 m$^2$) |
| 0.02 cm$^3$ (0.00002 L) | 0.356317748 cm$^2$ (0.000035632 m$^2$) | 50,000 | 17815.8874 cm$^2$ (1.78158874 m$^2$) |
| 0.01 cm$^3$ (0.00001 L) | 0.224466116 cm$^2$ (0.000022446 m$^2$) | 100,000 | 22446.6116 cm$^2$ (2.24466116 m$^2$) |
| 0.006666667 cm$^3$ (0.000006667 L) | 0.171299712 cm$^2$ (0.000017129 m$^2$) | 150,000 | 25694.95681 cm$^2$ (2.569495681 m$^2$) |

(CONTINUED ONTO NEXT FIGURE)

FIG. 10A (CONTINUED FROM PREVIOUS FIGURE)

| Volume of Sphere | Area of Sphere | Spheres Per Liter | Total Sphere Area Per Liter |
|---|---|---|---|
| 0.005 cm³ (0.000005 L) | 0.141404792 cm² (0.00014140 m²) | 200,000 | 28280.9584 cm² (2.82809584 m²) |
| 0.004 cm³ (0.000004 L) | 0.121858956 cm² (0.00012185 m²) | 250,000 | 30464.73893 cm² (3.046473893 m²) |
| 0.003333333 cm³ (0.00000333 L) | 0.107912046 cm² (0.00001079 m²) | 300,000 | 32373.61372 cm² (3.237361372 m²) |
| 0.002857143 cm³ (0.00000286 L) | 0.097373051 cm² (0.00000974 m²) | 350,000 | 34080.5677 cm² (3.40805677 m²) |

(CONTINUED ONTO NEXT FIGURE)

FIG. 10B (CONTINUED FROM PREVIOUS FIGURE)

| Volume of Sphere | Area of Sphere | Spheres Per Liter | Total Sphere Area Per Liter |
|---|---|---|---|
| 0.0025 cm³ (0.0000025 L) | 0.08907943 cm² (0.00000890 m²) | 400,000 | 35631.7748 cm² (3.56317748 m²) |
| 0.00222222 cm³ (0.00000222 L) | 0.08235230 cm² (0.00000823 m²) | 450,000 | 37058.53671 cm² (3.705853671 m²) |
| 0.002 cm³ (0.000002 L) | 0.07676633 cm² (0.00000767 m²) | 500,000 | 38383.16585 cm² (3.838316585 m²) |
| 0.00181818 cm³ (0.00000181 L) | 0.07204033 cm² (0.00000720 m²) | 550,000 | 39622.18152 cm² (3.962218152 m²) |

(CONTINUED ONTO NEXT FIGURE)

FIG. 10C (CONTINUED FROM PREVIOUS FIGURE)

| Volume of Sphere | Area of Sphere | Spheres Per Liter | Total Sphere Area Per Liter |
|---|---|---|---|
| 0.001666667 cm³ (0.000001667 L) | 0.0679800343 cm² (0.0000067980 m²) | 600,000 | 40788.20554 cm² (4.078820554 m²) |
| 0.001538462 cm³ (0.000001538 L) | 0.0644477881 cm² (0.0000064447 m²) | 650,000 | 41891.12242 cm² (4.189112242 m²) |
| 0.001428571 cm³ (0.000001429 L) | 0.0613411164 cm² (0.0000061341 m²) | 700,000 | 42938.81461 cm² (4.293881461 m²) |
| 0.001333333 cm³ (0.000001333 L) | 0.0585836666 cm² (0.0000058583 m²) | 750,000 | 43937.7493 cm² (4.39377493 m²) |

(CONTINUED ONTO NEXT FIGURE)

FIG. 10D (CONTINUED FROM PREVIOUS FIGURE)

| Volume of Sphere | Area of Sphere | Spheres Per Liter | Total Sphere Area Per Liter |
|---|---|---|---|
| 0.00125 cm³ (0.00000125 L) | 0.056116529 cm² (0.000005611 m²) | 800,000 | 44893.22312 cm² (4.489322312 m²) |
| 0.001176471 cm³ (0.000001176 L) | 0.053893734 cm² (0.000005389 m²) | 850,000 | 45809.67399 cm² (4.580967399 m²) |
| 0.001111111 cm³ (0.000001111 L) | 0.051878701 cm² (0.000005187 m²) | 900,000 | 46690.83048 cm² (4.669083048 m²) |
| 0.001052632 cm³ (0.000001053 L) | 0.050042059 cm² (0.000005004 m²) | 950,000 | 47539.95599 cm² (4.753995599 m²) |
| 0.001 cm³ (0.000001 L) | 0.048359759 cm² (0.000004835 m²) | 1,000,000 | 48359.75862 cm² (4.835975862 m²) |

FIG. 10E

SYSTEM FOR CAPTURING CARBON DIOXIDE AND OTHER GASES

CROSS-REFERENCE TO RELATED APPLICATIONS

This patent claims priority to U.S. Provisional Patent Application No. 63/361,071, said application filed by the inventor herein, Walter A. Tormasi, on 23 Nov. 2021.

FIELD OF THE INVENTION

The invention is directed at capturing gases, including carbon dioxide, using chemical fluid/media. Multiple fields are implicated by the invention, including gas sequestration, decarbonizing devices, and applied chemistry.

BACKGROUND OF THE INVENTION

Oil, coal, and other carbon-based fuels generate greenhouse gases. Such greenhouse gases, including carbon dioxide, trap heat within Earth's atmosphere. The trapped heat causes global warming and climate change, leading to food shortages, flooding, severe weather, drought, and other adverse effects. These consequences are serious, to say the least.

Because global warming and climate change are. driven by greenhouse gases, levels of carbon dioxide in the atmosphere have been closely followed. Notably, at the beginning of the twentieth century, atmospheric carbon-dioxide levels amounted to around 295 parts per million Levels have since climbed by 40%, to around 415 parts per million. That increase has greatly amplified the greenhouse effect.

Numerous governments and organizations have declared global warming and/or climate change to be an ongoing emergency. Based on current carbon-emission trends, some scientists predict that the greenhouse effect will reach its precipice by 2050, causing irreversible havoc on our planet, our society, and our future existence. Although scientific and political debate on the greenhouse issue continues, the consensus is that steps should be taken to minimize or reduce the level of carbon dioxide in Earth's atmosphere.

Devices exist to capture carbon dioxide from industrial or environmental origins. Such devices are typically classified based on their feed source. Most carbon-capturing devices are fed by flue gas or ambient air. In flue-gas systems, carbon dioxide is captured from factories, power plants, and other point-of-emission sources. In ambient-air systems (known as direct air capture, or DAC), carbon dioxide is extracted, post-emission, from the surrounding environment.

Each of the foregoing systems has unique engineering challenges. For example, industrial sources discharge large volumes of gases, with such gases being rich in carbon dioxide. Those factors necessitate high-throughput and high-efficiency decarbonizing processes. However, in contrast to point-of-emission sources, ambient air is maintained at standard atmospheric pressure and features relatively low carbon-dioxide concentrations (approximately 0.0415%). Those factors necessitate high-sensitivity and high-selectivity decarbonizing processes. Flue-gas and ambient-air systems must be tailored accordingly (which explains why carbon-capturing systems are classified by their feed source).

Feed sources aside, carbon-capturing systems are further divided into chemical and physical classes. Falling in the chemical class are devices employing one or more chemical fluids capable of dissolving carbon dioxide. Such dissolving chemicals include amine-based solvents, as well as sodium hydroxide and equivalent caustic agents. Falling in the physical class are devices employing solid materials capable of binding carbon-dioxide molecules. Such binding materials include metal-organic frameworks and carbon nanotubes.

Regardless of their feed sources or chemical or physical attributes, standard carbon-capturing devices rely on principles of absorption or adsorption. Both principles are similar in import, in that they ultimately result in the sequestration of gaseous elements or molecules. In the absorption process, however, gases are dissolved, volume-wide, in the absorbent. Conversely, in the adsorption process, gases are bound to the adsorbent at the surface region.

Many carbon-capture technologies, including physical-media systems, are experimental or immature. Those technologies therefore enjoy minimal, if any, commercial success. At this point, it cannot be determined whether any of the physical-media systems will satisfy current or future industry requirements. That uncertainty necessitates continued focus on improving existing commercial devices.

One established carbon-capture technology relies on chemical solvents. Chemical decarbonizing solvents were first employed in the 1930s to sweeten natural gas. The chemical methodology was later adopted to scrub flue gas and continues to be employed today for decarbonizing purposes. Although new solvents have been introduced to increase carbon-capture efficiency, the chemical decarbonizing process has remained unchanged, essentially involving two primary steps.

The first carbon-capturing step involves exposing carbon dioxide to the chemical solvent. Such exposure typically occurs inside an admixing chamber. The admixing chamber, of course, houses the chemical solvent. The chemical solvent is either free-standing or suspended in porous material such as filters or sponges. Feed gas (ambient air or flue exhaust) is then injected into the admixing chamber. The feed gas makes contact with the solvent, causing carbon dioxide to be scrubbed from the feed gas and dissolved into the solvent. The decarbonized feed gas is returned to the environment, while the chemical solvent is retained for follow-up processing.

The second carbon-capturing step involves stripping dissolved carbon dioxide from the solvent. The stripping process, known as desorption, occurs inside another containment vessel. Within that vessel, saturated solvent is heated to critical temperature, causing the dissolved carbon dioxide to be released/desorbed. The extracted carbon dioxide is then collected and stored for future use or disposal, while the remaining solvent is regenerated and recycled.

Chemical decarbonizing systems of the above nature have numerous disadvantages. Some disadvantages relate to fluid contact/interaction, while other disadvantages relate to chemical flow. Both disadvantages impede overall efficiency.

As indicated above, some chemical decarbonizing systems employ solvent-impregnated suspension lattices such as filters or sponges. All nonmalleable objects, including suspension lattices, feature fixed surface area. That quality impedes dissolution by limiting the surface area of exposed solvent. Moreover, because solvent is embedded in the suspension lattice, all post-dissolution processing must be performed unitarily, meaning that the entire suspension lattice must be removed, and heated, for desorption purposes.

Devices employing free-standing solvent also have disadvantages. In those systems, feed gas is typically injected into the base of the admixing chamber in an uninterrupted fashion. Because feed gas is buoyant and moves toward decreasing pressure, solvent-traversing feed gas forms into one continuous conical or cylindrical pocket. The geometry of the gas pocket limits exposed surface area and dissolution rates.

Other major disadvantages exist. For present purposes, however, it suffices to say that chemical decarbonizing systems are in need of improvement. This is especially true regarding fluid contact/interaction and chemical flow, both of which impact efficiency in one way or another.

SUMMARY OF THE INVENTION

The invention is directed at, among other things, improving the efficiency of devices for capturing and sequestrating select gases, including carbon dioxide, using chemical fluids. The invention impacts decarbonizing devices employing chemical-impregnated suspension lattices, such as the device shown in FIG. 1 (Prior Art). The invention also impacts decarbonizing devices employing free-standing chemicals, such as the device shown in FIG. 11 (Prior Art). Also impacted are devices for capturing gases other than carbon dioxide, as made clear by the disclosure and associated claims.

All embodiments of the invention enable the packetization of admixing constituents. Specifically, under one embodiment of the invention, chemicals are delivered to the admixing chamber in droplet form. Under another embodiment of the invention, the packetized constituent is feed gas (not chemicals), with such feed gas being delivered in bubble form (not droplet form). Both embodiments, as well as variants thereof, overcome the aforementioned prior-art limitations.

The droplet-based delivery system comprises an admixing chamber, chemical fluid, gas-streaming means, and an atomizing device. The admixing chamber is where the feed gas and chemical fluid interact. In its operative mode, the invention utilizes streaming means (such as pressure from wind, canisters, flues, compressors, fans, or vacuums) to push or pull feed gas into the admixing chamber. An atomizer then releases chemical droplets into the admixing chamber, causing the droplets to interact with, and capture, confined feed gas.

The bubble-based delivery system similarly comprises an admixing chamber, chemical fluid, and gas-streaming means. However, unlike the droplet system, the bubble system enables the creation and delivery of packetized feed gas, not packetized chemicals. To that end, the admixing chamber contains free-standing chemical media, with feed gas being injected into the lower region of the chamber. The invention employs various techniques and apparatuses to packetize feed gas. As discussed below, one embodiment utilizes metering means, such as electronically or mechanically controlled valves, to enable periodic or intermittent gas injection. Another embodiment utilizes rerouting means, such as screens or ducts, to redirect and compartmentalize feed gas. Another embodiment utilizes perturbation means, such as rotary paddles or sound emitters, to disrupt congregating gas. Another embodiment utilizes stream-dividing means, such as multiple intake ports or output splitters, to achieve parallel gas injection. All such embodiments, whether employed singly or jointly, are effective at creating bubbles of feed gas within chemical media.

Notably, as disclosed and claimed, the droplet and bubble systems go beyond decarbonizing applications. This is because the invention is not dependent on any specific chemical or gas. So any type of gas can be fed into the admixing chamber, and, likewise, any chemical can be used to target gases other than carbon dioxide. The invention, accordingly, has wide-ranging implications, affecting not only decarbonizing systems but also all gas-sequestration devices in general.

Whatever combination of chemicals or gases is chosen, the droplet and bubble systems have numerous advantages over prior art. One advantage relates to surface area. That advantage stems from the packetization function, which broadens the exposed surfaces of either chemical fluid (in the case of the droplet system) or feed gas (in the case of the bubble system). Other advantages relate to progressive cycling and chemical flow, both of which are discussed below.

BRIEF DESCRIPTION OF THE DRAWINGS

Numerous drawings are supplied. Two of those drawings depict prior art, while the remaining drawings inclusively illustrate miscellaneous aspects of the invention.

For reference purposes, FIG. 1 (Prior Art) depicts, in side cross-sectional view, an ordinary decarbonizing device relying on chemicals suspended within porous material.

FIG. 10A, FIG. 10B, FIG. 10C, FIG. 10D, and FIG. 10E depict, in table form, select data, including surface area, for spheres having volumes ranging from 1000 cubic centimeters (1 liter) to 0.001 cubic centimeter (0.000001 liter).

Figure 11:
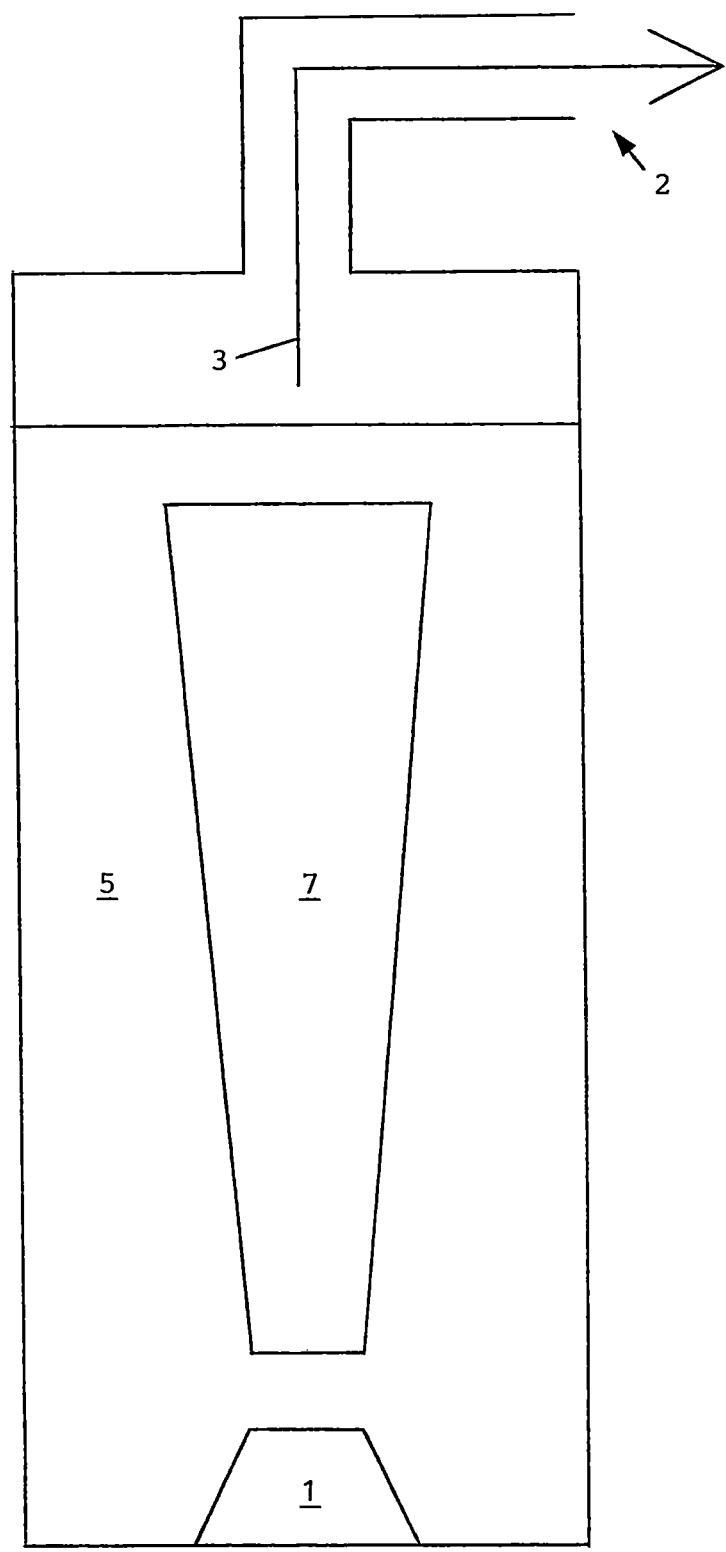
Figure 11:
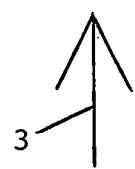

For reference purposes, FIG. 11 (Prior Art) depicts, in side cross-sectional view, an ordinary decarbonizing device relying on free-standing chemical media.

Figure 12:
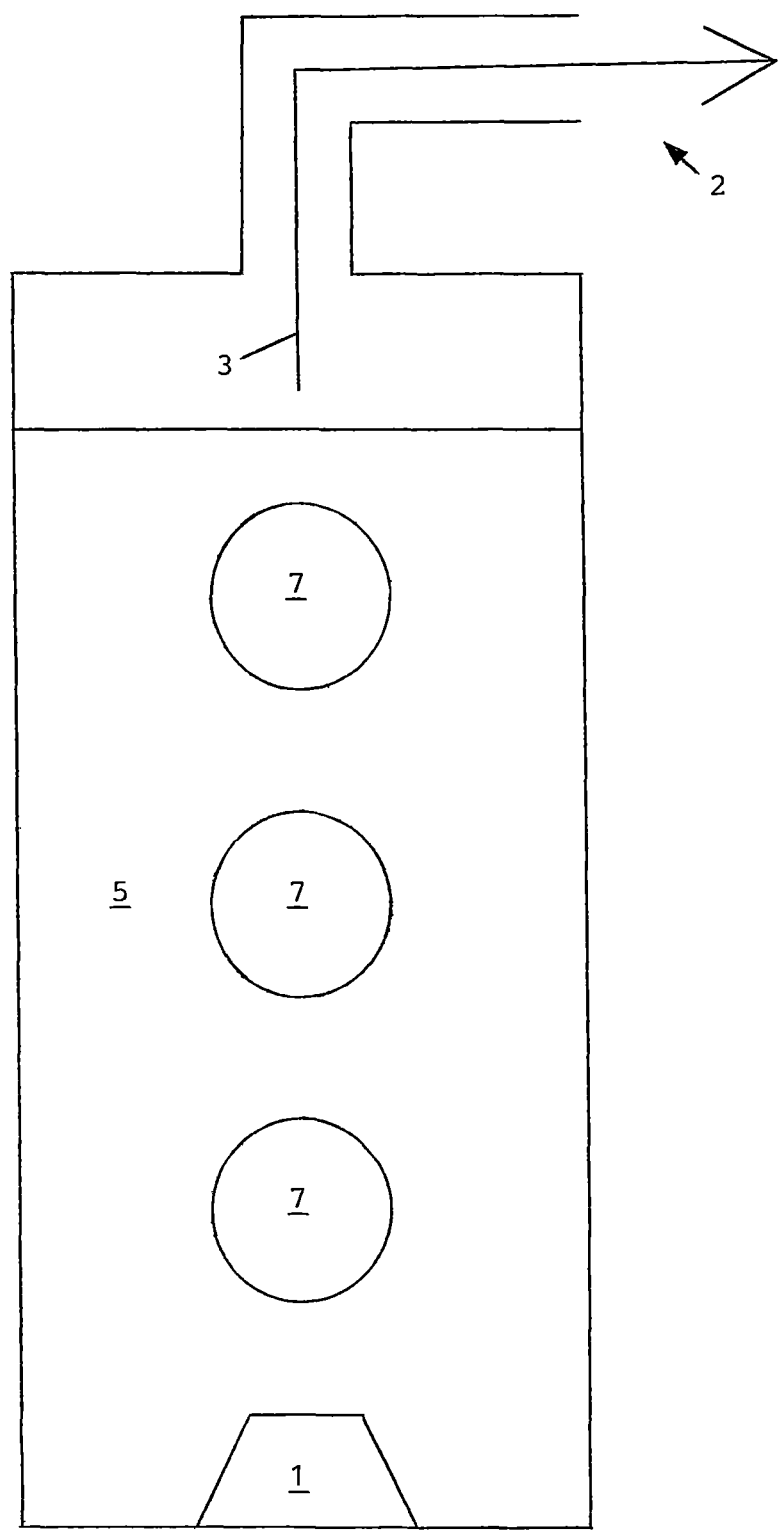
Figure 12:
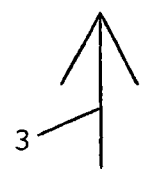

FIG. 12 depicts, in side cross-sectional view, one embodiment of the bubble-based delivery system, said embodiment employing metering means (not shown) for gas packetization.

Figure 13:
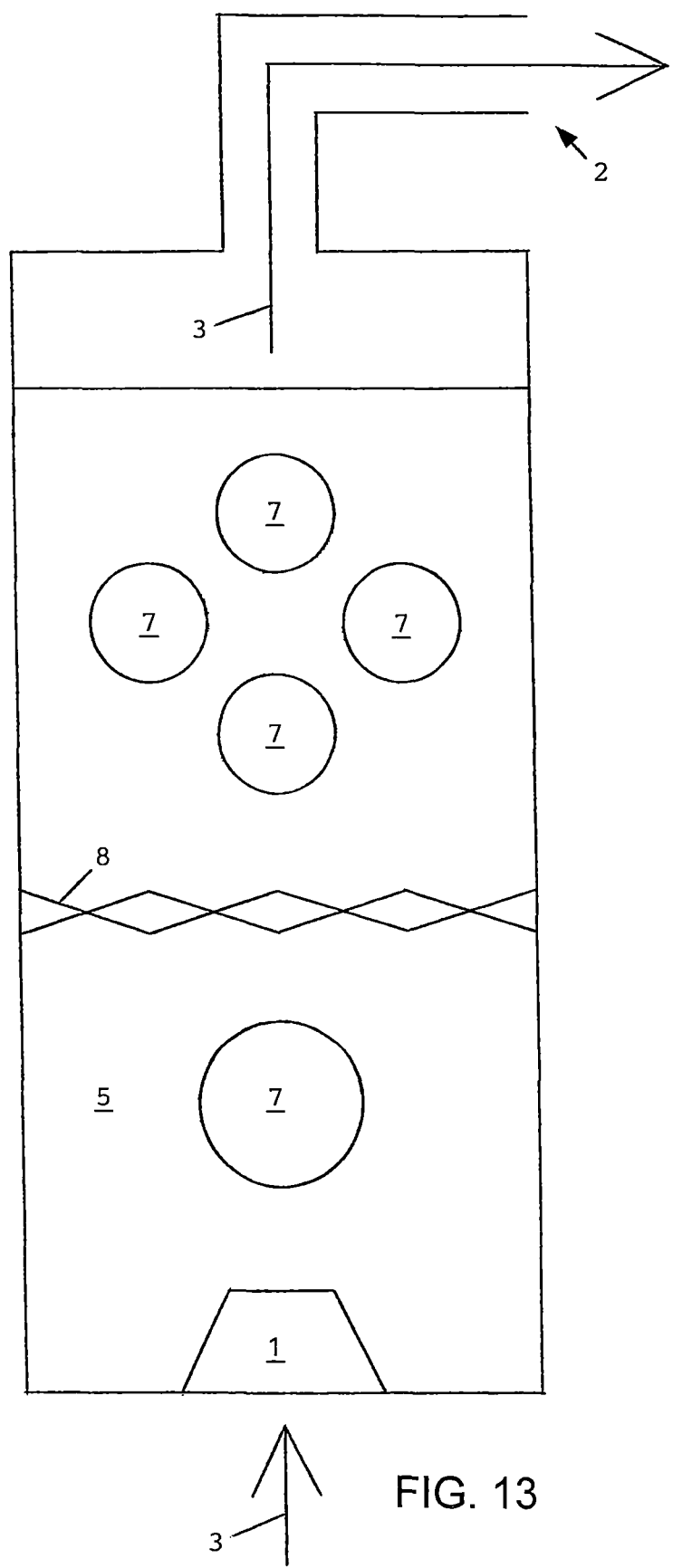
Figure 14:
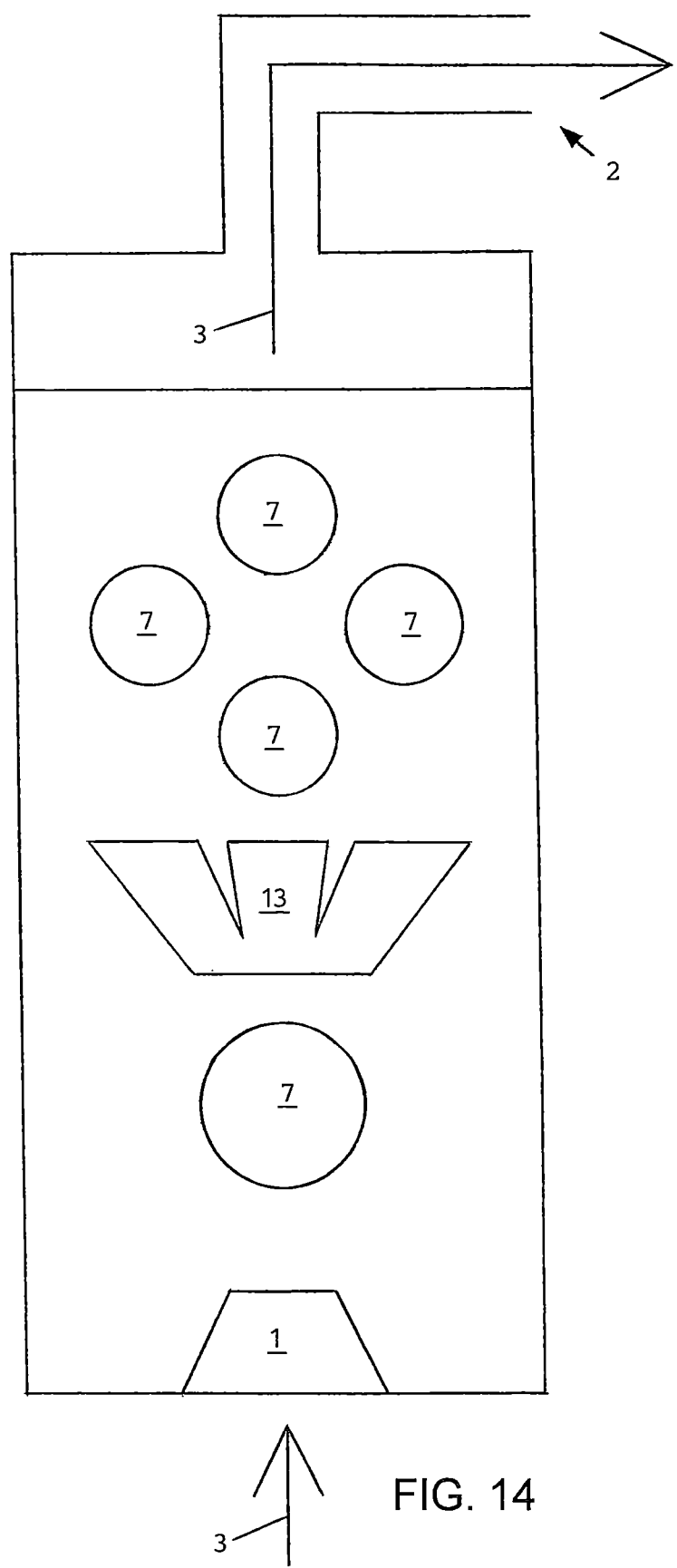

FIG. 13 and FIG. 14 depict, in side cross-sectional view, various embodiments of the bubble-based delivery system, said embodiments featuring rerouting means (pictorially represented as elements 8 and 13) for gas packetization.

Figure 15:
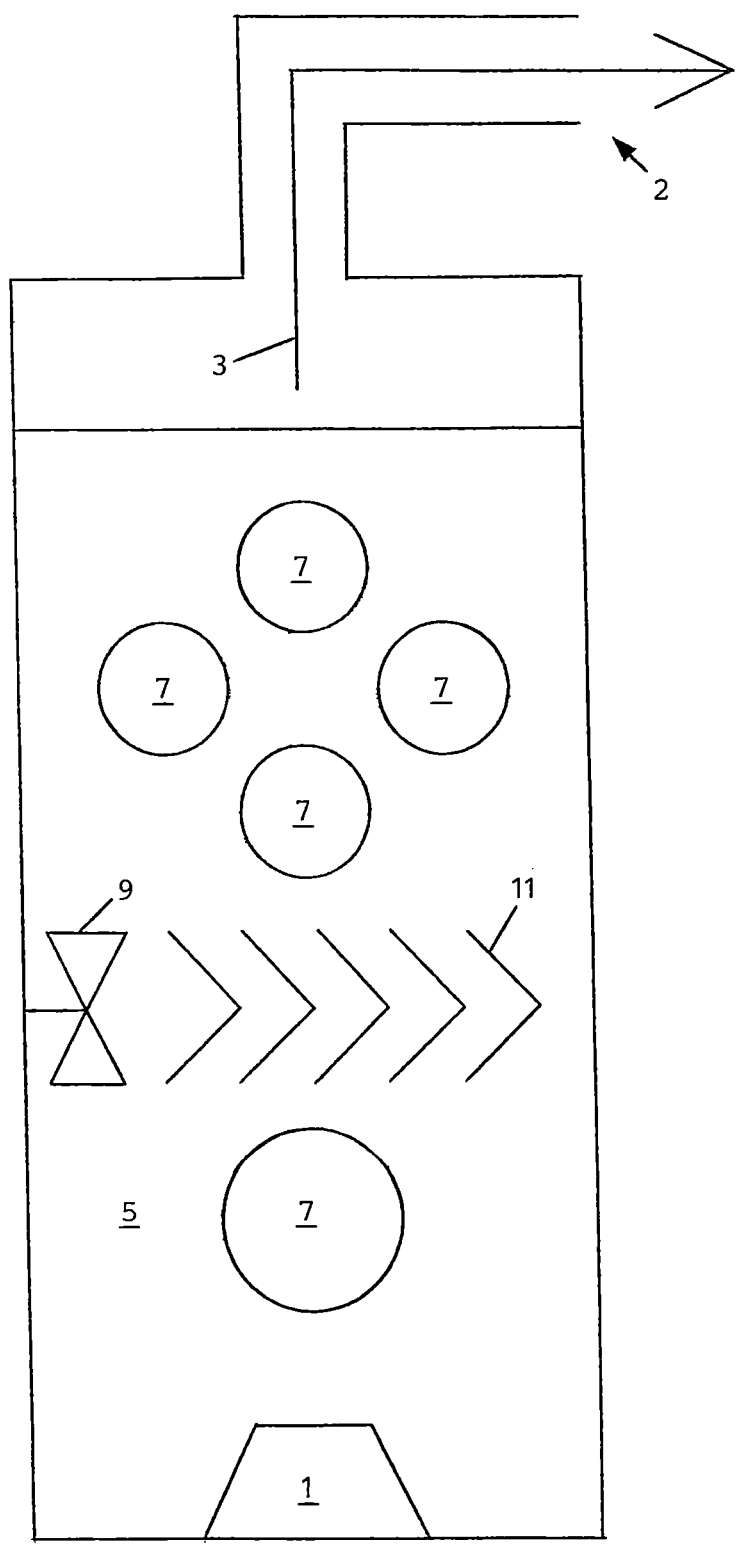
Figure 16:
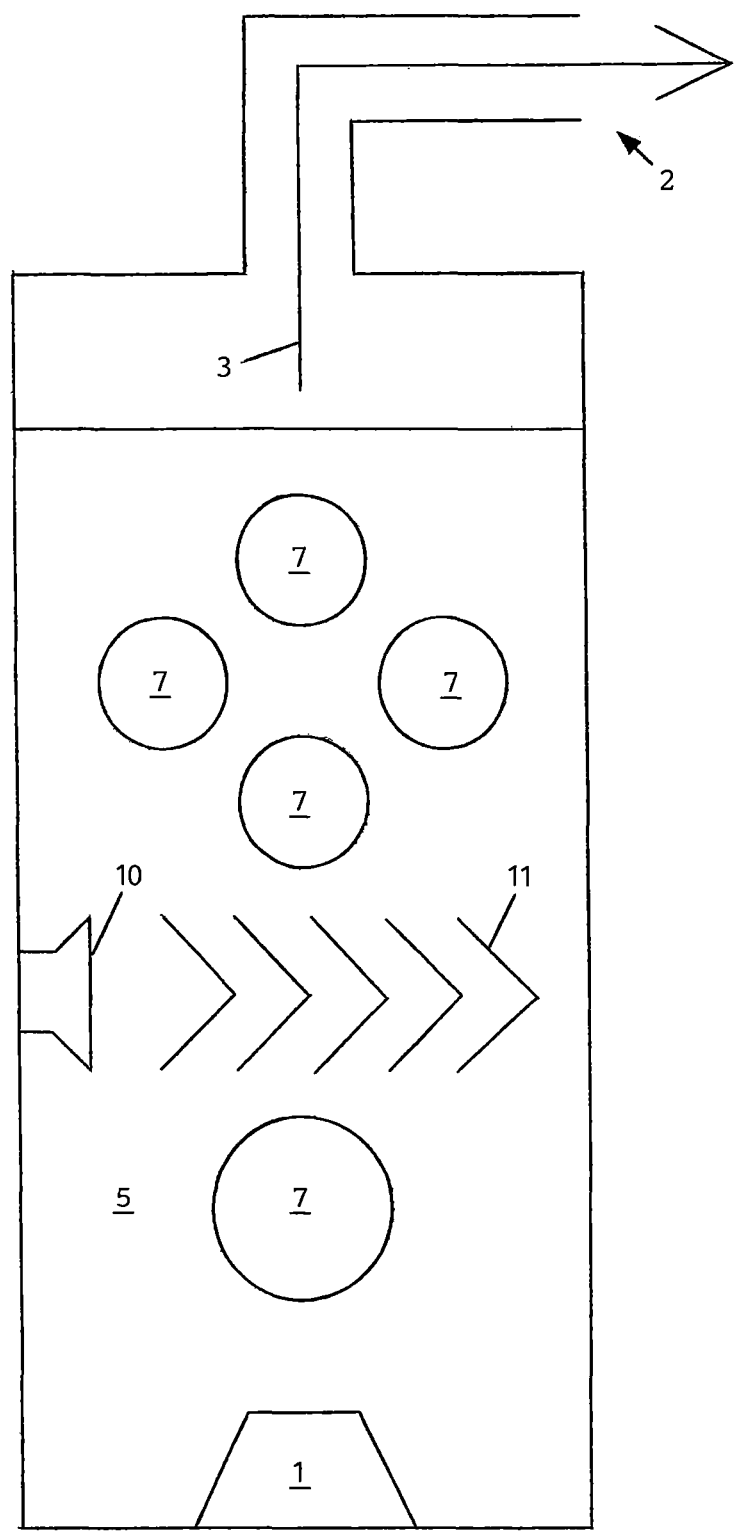

FIG. 15 and FIG. 16 depict, in side cross-sectional view, various embodiments of the bubble-based delivery system, said embodiments featuring perturbation means (pictorially represented as elements 9 and 10) for gas packetization.

Figure 17:
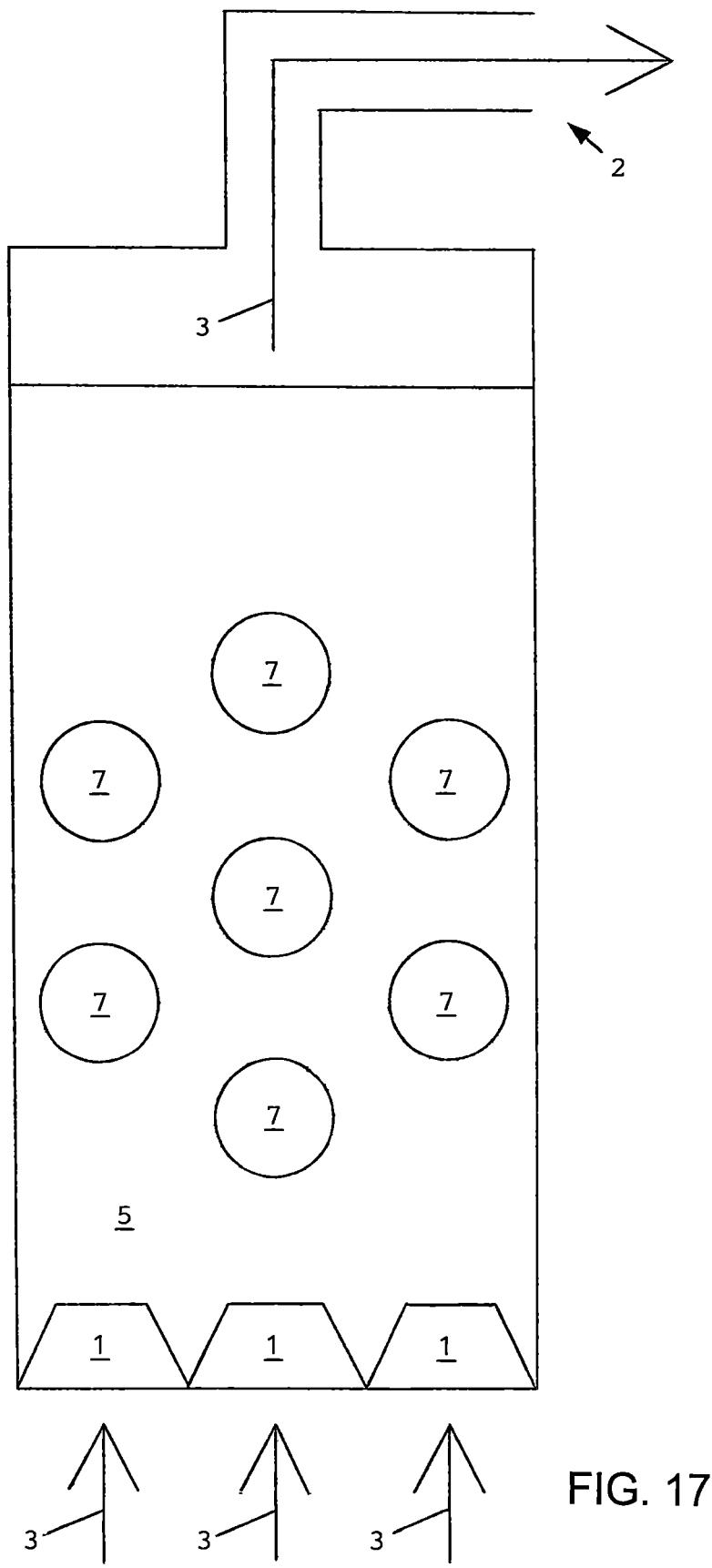
Figure 18:
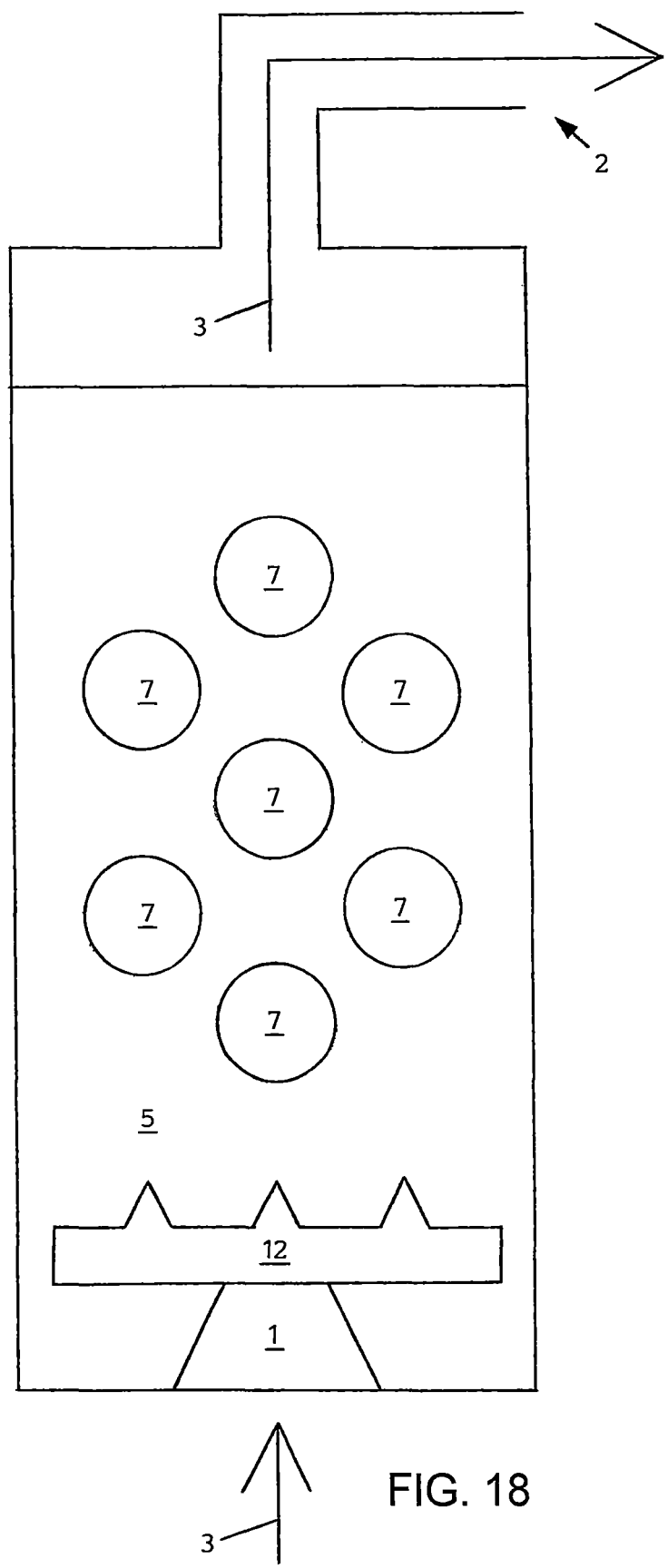

FIG. 17 and FIG. 18 depict, in side cross-sectional view, various embodiments of the bubble-based delivery system, said embodiments featuring stream-dividing means (pictorially represented as elements 1 and 12) for gas packetization.

Included within the foregoing drawings are various elements, namely, intake port 1, exhaust port 2, gas-stream trajectory 3, suspension lattice 4, chemical 5, atomizer 6, gas 7, screen 8, rotary paddle 9, sound emitter 10, perturbation wave 11, output-splitting device 12, and duct 13.

The foregoing drawings and elements are thoroughly and comprehensively discussed in the below disclosure.

DETAILED DESCRIPTION OF THE INVENTION

As indicated, the invention encompasses two discrete but related delivery systems. Both systems perform packetization functions. However, one system delivers chemical droplets, while the other system delivers gas bubbles.

A detailed description of the foregoing systems is provided below. The detailed description is divided into five subparts, designated Subparts A through E. As indicated by their headings, Subparts A and B discuss the embodiments and advantages of the droplet-based delivery system. Subparts C and D, in contrast, discuss the embodiments and advantages of the bubble-based delivery system. Finally, Subpart E provides concluding remarks concerning both delivery systems.

Subpart A

Embodiments of Droplet System

The droplet-based delivery system features numerous embodiments. All embodiments, however, comprise four common elements, namely, an admixing chamber (for confining and uniting matter); streaming means (for placing gas in confinement); chemical fluid (for binding confined gas); and an atomizing device (for creating and delivering chemical droplets within the admixing chamber). Such components serve as the foundation for all embodiments of the droplet-based delivery system.

Figure 1:
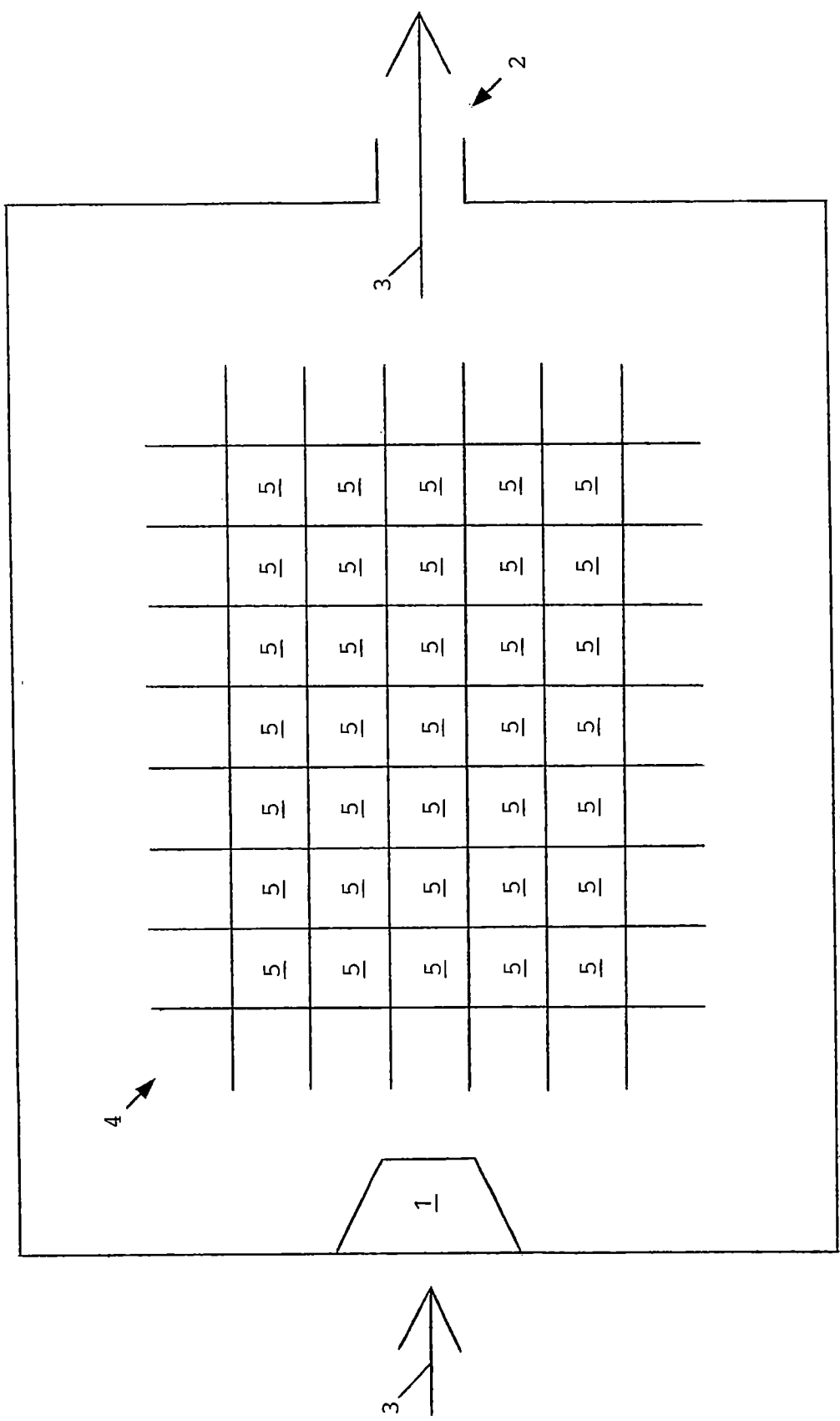

To fully appreciate the invention, and to provide context for the disclosure, the droplet system must first be juxtaposed with conventional technology. FIG. 1 (Prior Art), as noted, depicts an ordinary decarbonizing device. The decarbonizing device employs an admixing chamber, said admixing chamber featuring intake port 1 and exhaust port 2. Located within the chamber is suspension lattice 4, which holds chemical 5. Feed gas follows trajectory 3. Thus, during operation, feed gas enters intake port 1, passes through suspension lattice 4, contacts chemical 5, and exits exhaust port 2.

Figure 2:
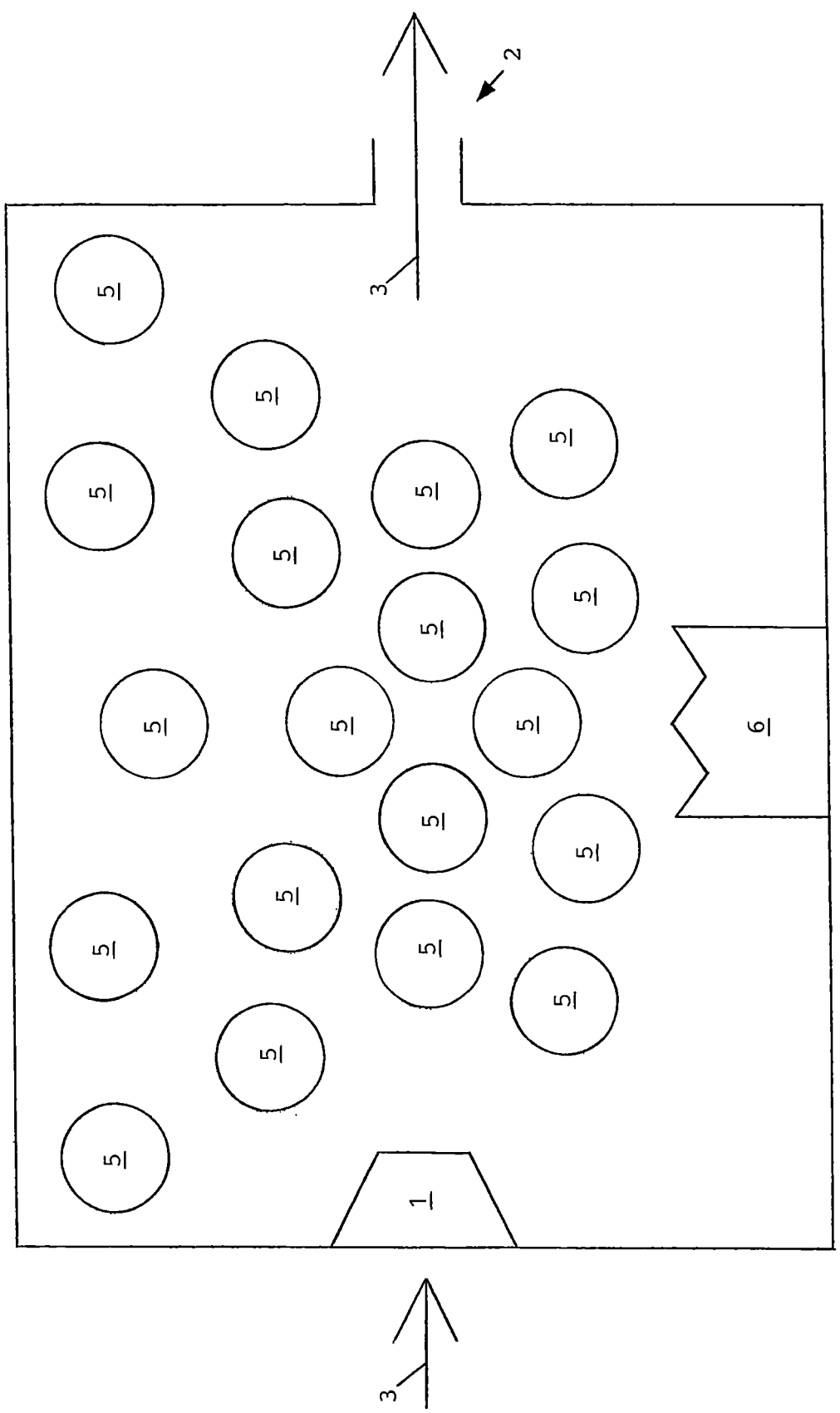
FIG. 2 depicts, in side cross-sectional view, one embodiment of the droplet-based delivery system, said embodiment featuring an individual atomizing device (pictorially represented as element 1) for chemical packetization.

FIG. 2 depicts the droplet-based delivery system as invented. Unlike the conventional system represented in FIG. 1 (Prior Art), the droplet system is capable of packetizing chemicals and delivering such packetized chemicals into the admixing chamber in droplet form. The chemical droplets then intermix with confined feed gas, causing confined gas to bind to the chemical droplets via absorption/adsorption.

These packetizing, intermixing, and binding functions are discussed below. Also discussed below are various modes for implementing the droplet system as invented.

First and foremost, the droplet system comprises not only an admixing chamber and chemical fluid but also streaming means. The streaming means (not depicted in the drawings) is employed to push or pull feed gas into the admixing chamber. The streaming means may comprise positive or negative pressure from wind, canisters, flues, compressors, fans, vacuums, or any other available gas source or gas-streaming device. In short, any natural or artificial mechanism may be used to push or pull feed gas into the admixing chamber.

The invention employs an atomizer to implement the packetization function. Specifically, referring to FIG. 2, atomizer 6 is interfaced with the interior of the admixing chamber. Feed gas follows trajectory 3, entering the admixing chamber through intake port 1. In its operative mode, atomizer 6 ejects chemical 5, doing so in droplet form. The packetized projectile, chemical 5, interacts with surrounding feed gas, causing components of feed gas to bind to chemical 5.

FIG. 2 depicts chemical 5 in midflight. That suspended state, of course, is temporary. To mention the obvious, gravitational forces will eventually cause chemical 5 to settle to the bottom of the admixing chamber and to pool together in free-standing (nonpacketized) form. Settled chemicals, at that point, must be stored and managed.

Figure 3:
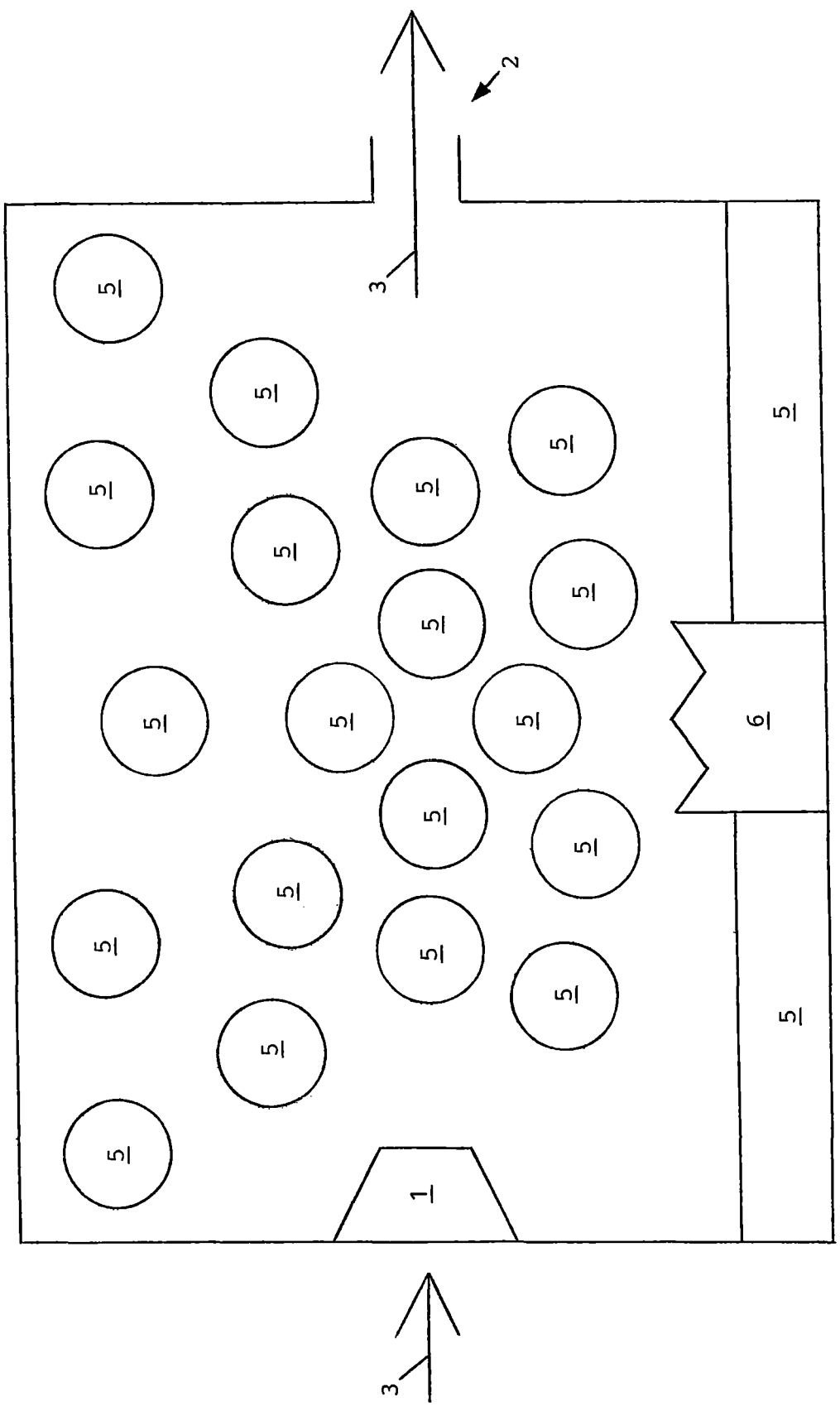
FIG. 3 and FIG. 4 depict, in side cross-sectional view, various embodiments of the droplet-based delivery system, said embodiments featuring an internal reservoir (FIG. 3) or external reservoir (FIG. 4) for chemical collection.
Figure 4:
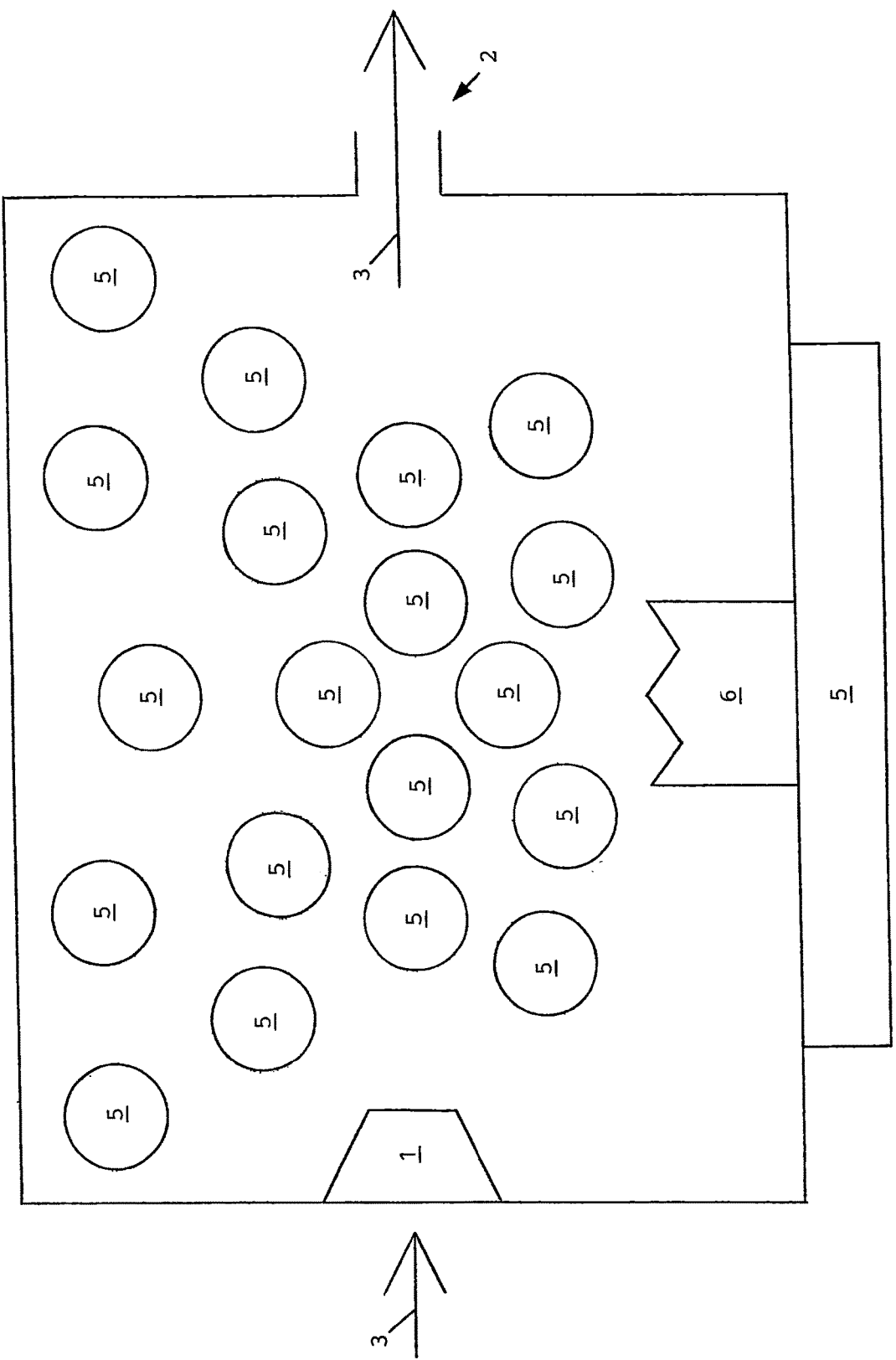

One embodiment of the invention deals with settled chemicals by utilizing an internal reservoir, that is, by collecting and retaining chemicals on the chamber floor. That embodiment is depicted in FIG. 3. Another embodiment of the invention deals with settled chemicals by draining such chemicals into an external reservoir. That embodiment is depicted in FIG. 4. Under both embodiments, stored chemicals can be recycled through atomizer 6 until chemical 5 is saturated, at which point chemical 5 can be transferred to another vessel for stripping and regeneration.

The systems shown in FIGS. 2, 3, and 4 feature one atomizer. Multiple atomizers, however, may be utilized (and are recommended) for purposes of chemical packetization and delivery. To illustrate that point, various multi-atomizer embodiments are depicted in FIGS. 5 through 9. All such drawings are cross-sectional depictions of an admixing chamber, said admixing chamber viewed through either its side walls (as in FIG. 5) or its end caps (as in FIGS. 6, 7, 8, and 9).

Figure 5:
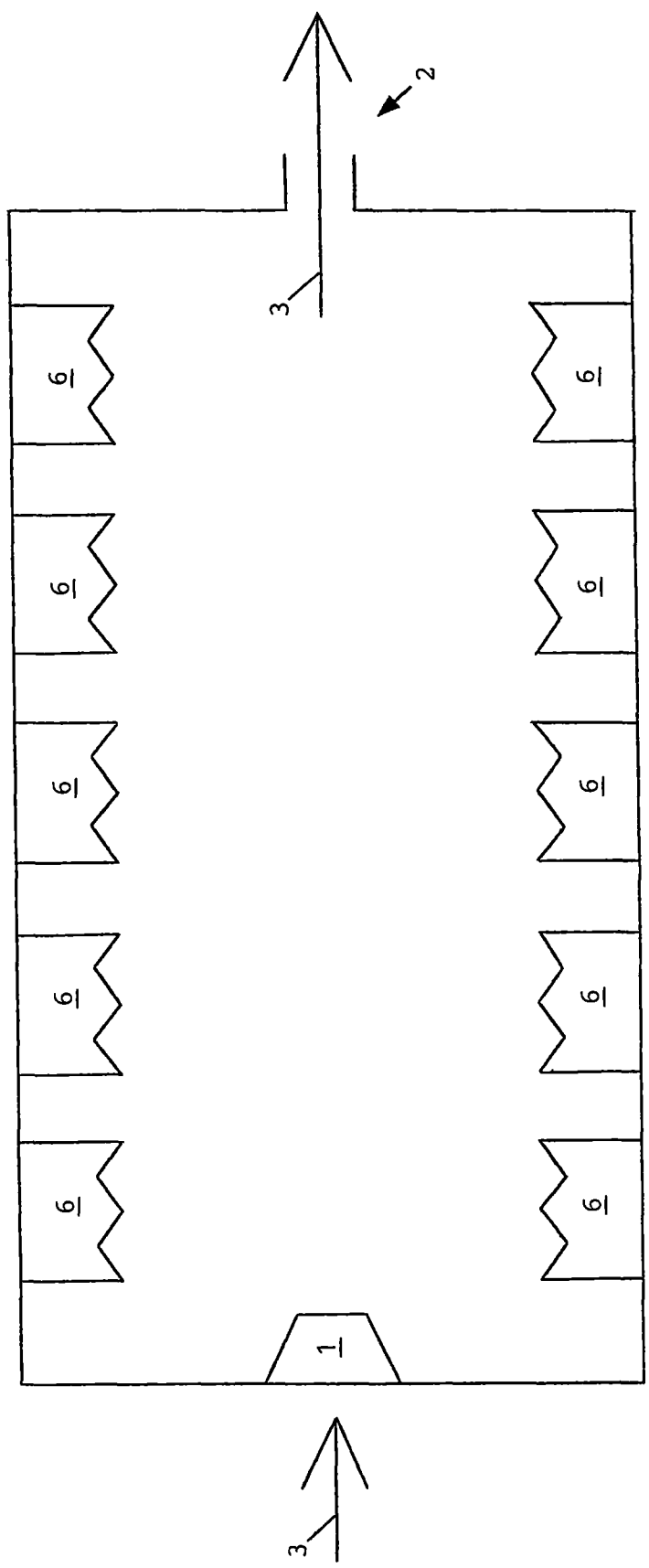
FIG. 5, FIG. 6, FIG. 7, FIG. 8, and FIG. 9 depict, in side or terminus cross-sectional view, various embodiments of the droplet-based delivery system, said embodiments featuring multiple atomizers along the inner chamber walls.
Figure 6:
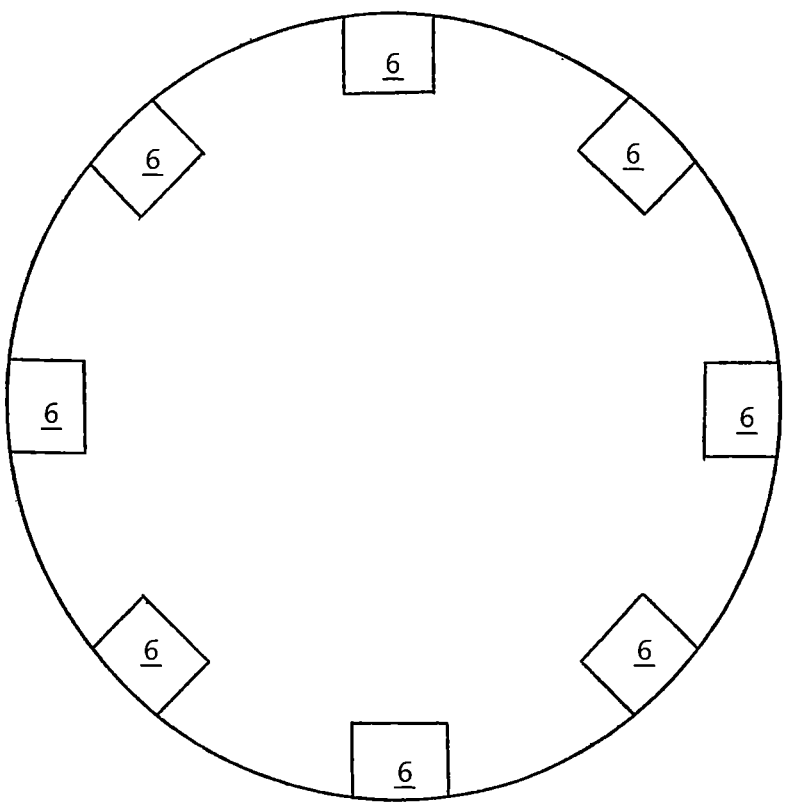
Figure 7:
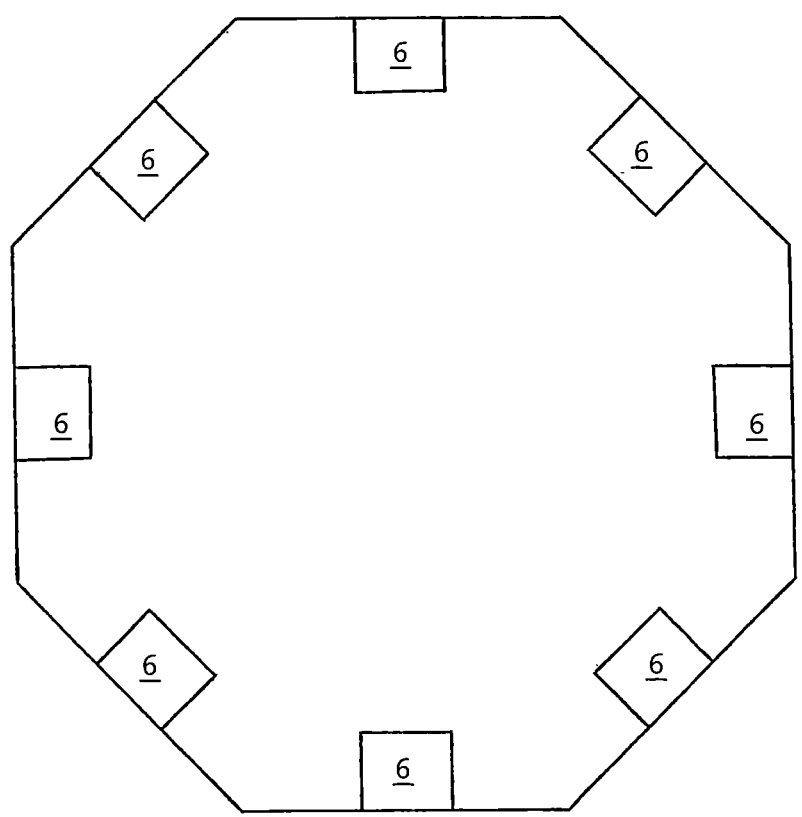
Figure 8:
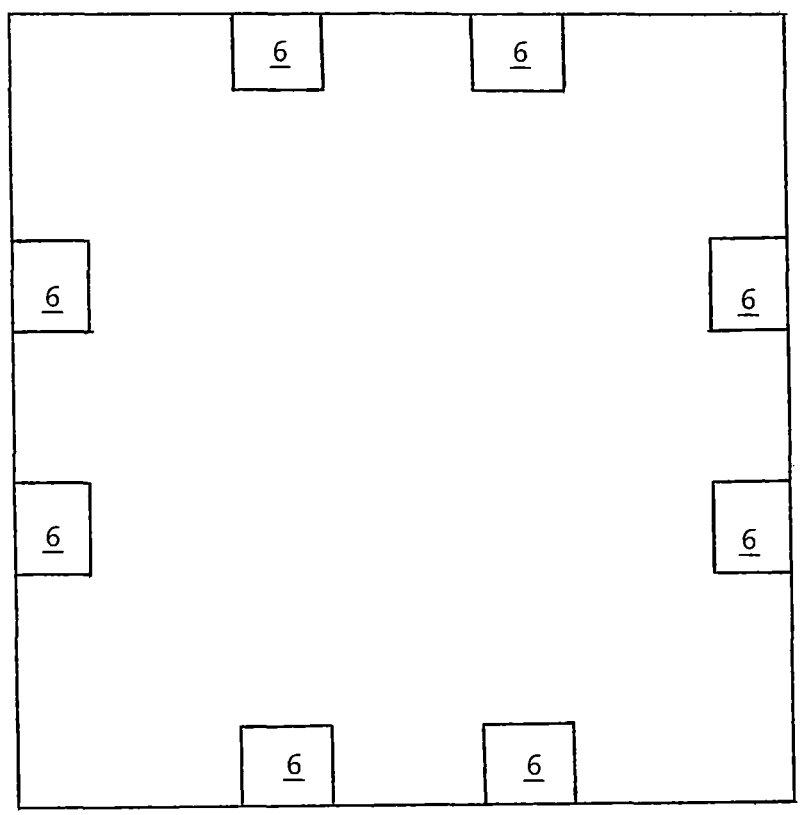
Figure 9:
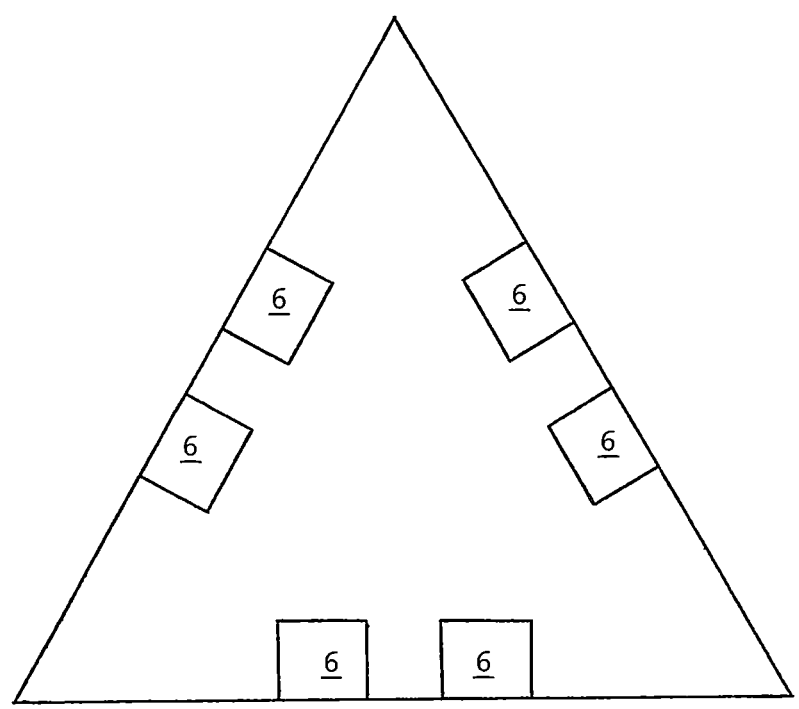

As illustrated in FIG. 5, one multi-atomizer embodiment features an arrangement of two opposing rows. Each row, in turn, contains five atomizers. One five-atomizer row is situated along the chamber floor, while the other five-atomizer row is situated along the chamber ceiling. It must be noted that FIG. 5 is inclusive in nature. For that reason, any number of rows or atomizers may be employed, with the rows and atomizers being arranged in any chosen fashion.

In that spirit, FIGS. 6 through 9 depict alternative multi-atomizer embodiments. As shown therein, atomizers may be situated along all inner walls of the admixing chamber. That peripheral arrangement has the benefit of allowing the atomizers to envelope the entire admixing chamber, promoting ubiquitous exposure of feed gas to packetized chemicals. Incidentally, the peripheral arrangement can be implemented regardless of whether the admixing chamber is cylindrical (as in FIG. 6); is shaped into octagonal, square, or triangular prisms (as in FIGS. 7, 8, and 9, respectively); or takes the form of other geometrical configurations.

In addition to the multi-atomizer embodiments, it is preferred that the atomizers deliver the smallest droplets possible. The reason relates to increased surface area. In that regard, FIGS. 10A, 10B, 10C, 10D, and 10E depict, in table form, various characteristics of spherical objects, including volume and surface area. The drawings illustrate an important geometrical fact, namely, that smaller spheres have greater aggregate surface area per unit of volume. The atomizers should therefore be designed and configured to discharge the finest droplets in order to maximize aggregate surface area.

Whatever embodiment is utilized, it is recommended that precautions be taken to prevent chemical aerosols from escaping the admixing chamber. This is because many chemicals, especially chemicals employed in decarbonizing devices, are harmful to the environment. The venting of chemical aerosols is therefore discouraged and should be avoided if possible.

Various measures may be adopted to prevent escaping chemical aerosols. For example, filters or membranes can be positioned at the exhaust port. The filters or membranes would be capable of blocking micron-sized particles, including chemical aerosols. Additionally, condensing devices or liquid barriers may be incorporated into the admixing chamber. Exhaust gas would pass through such devices or barriers before being vented, thereby removing chemical aerosols. These embodiments are inclusive, as other aerosol-containment measures can certainly be taken within the scope of the invention.

Subpart B

Advantages of Droplet System

The droplet-based delivery system has numerous advantages over prior art. Those advantages primarily relate to chemical flow, surface area, and progressive cycling, all of which increase efficiency in one way or another.

Unlike carbon-capturing devices that rely on chemical-impregnated suspension lattices, the droplet system employs free-flowing chemicals. The chemicals are ejected by the atomizers but eventually settle to the bottom of the admixing chamber. Thus, unlike lattice-based devices, the droplet system allows chemicals to be drained and transferred to another vessel for stripping and regeneration.

The droplet system also features advantageous surface-area and progressive-cycling characteristics. Unlike all prior-art decarbonizing devices, the droplet system delivers packetized chemicals. Such packetized delivery is progressive in nature. The atomizers, in other words, continuously or periodically eject chemical droplets. Droplet surface area, as such, is constantly renewed with the passage of time.

The foregoing surface-area and progressive-cycling characteristics can be mathematically quantified. As noted, FIGS. 10A through 10E depict, in table form, miscellaneous sphere-related properties. Such properties can be applied to the droplets. It is acknowledged that the droplets ejected from the atomizers will not be uniform spheres, especially when the droplets undergo acceleration (upon ejection) or deceleration (after ejection). However, spheres represent the closest geometrical approximation of the droplets. All surface-area calculations are therefore based on spherical dimensions. It is understood, of course, that distortions in droplet shape will affect the spherical surface area as calculated.

For calculation purposes, it will be assumed that the atomizers collectively output 1 liter of fluid per discharge cycle. It will further be assumed that the atomizers eject droplets measuring 0.001 $cm^3$ (0.000001 liter). Here, again, reference is made to the mathematical table, particularly the last row appearing in FIG. 10E. According to that row, droplets of the foregoing volume will feature individual surface area of 0.048359759 $cm^2$ (0.000004836 $m^2$). One million such droplets compose 1 liter of fluid. Thus, as indicated by the last row in FIG. 10E, the droplets at issue feature aggregate surface area of 48359.75862 $cm^2$ (4.835975848 $m^2$) per liter.

These surface-area calculations apply to each discharge cycle. Now, assuming that the atomizers engage in 10 discharge cycles per second, then per-second surface area will total 483597.5862 $cm^2$ (48.35975862 $m^2$). If that per-second figure is extended to one day (86400 seconds), then per-day surface area will total 41782831447.6800 $cm^2$ (4178283.14476800 $m^2$). Finally, if that per-day figure is extended to one year (365.25 days), then per-year surface area will total 15261179186265.120000 $cm^2$ (1526117918.6265120000 $m^2$).

These cumulative surface-area figures, to reiterate, apply to 1 liter of fluid. If per-cycle fluid output is increased to 10 liters, and if all other metrics remain the same, then progressive surface area (that is, total surface area over time) will increase by one decimal position.

Finally, it is emphasized that the foregoing surface-area calculations are conservative. All calculations were based on the assumption that the atomizers discharged droplets having volumes of 0.001 $cm^3$ (0.000001 liter). Such microliter droplets are actually quite large, measuring 1 cubic millimeter. Existing atomizers, not surprisingly, are capable of ejecting less-voluminous droplets. Obviously, where nanoliter droplets are employed (that is, where droplets measure 0.000001 $cm^3$), then all aggregate surface-area measurements, as quoted above, must be multiplied by 10—thereby increasing aggregate surface area by another decimal position.

Subpart C

Embodiments of Bubble System

Turning now to the bubble-based delivery system, that system similarly comprises an admixing chamber and streaming means. However, unlike the droplet system, the bubble system delivers packetized gas, not packetized chemicals.

For reference purposes, FIG. 11 (Prior Art) depicts an ordinary admixing chamber containing free-standing chemical media. Feed gas follows trajectory 3, entering intake port 1, passing through chemical 5, and exiting exhaust port 2. As shown, while passing through chemical 5, gas 7 forms into one continuous conical or cylindrical pocket. The geometry of that gas pocket limits the surface area of traversing feed gas, inhibiting interaction between gas 7 and chemical 5.

The bubble-based delivery system, as noted, is directed at packetizing feed gas. Through its packetization function, the invention overcomes prior-art limitations by increasing the surface area of feed gas and thereby enhancing the gas-binding efficiency of decarbonizing devices.

The bubble system, of course, relies on streaming means to inject feed gas into the admixing chamber. Any pressurizing device can be employed to effectuate feed-gas injection. Such devices include, but are not limited to, canisters, flues, compressors, fans, or other positive-pressure apparatuses. Those streaming devices will necessarily be connected to the intake port, forcing feed gas to enter the admixing chamber for intermixing with chemical media.

The invention employs various methods for packetizing gaseous feedstock. Some of those methods are discussed below and illustrated in the accompanying drawings.

FIG. 12 depicts one embodiment of the bubble-based delivery system. That embodiment employs metering means (not shown) in order to deliver feed gas periodically or intermittently. The metering means may comprise any device capable of regulating gas delivery, including electronically or mechanically controlled valves. During operation, the valves or devices would open and close at designated intervals. Such opening/closing could be based on the elapse of time (as in time-regulated valves), on the volume of flowing gas (as in volume-regulated valves), on the buildup of gas pressure (as in pressure-regulated valves), or on other criteria. Whatever metering devices are used, feed gas is delivered periodically or intermittently into the admixing chamber. The result of that metering process is shown in FIG. 12. Specifically, as depicted therein, gas 7 traverses chemical 5 in bubble form.

FIGS. 13 through 18 illustrate additional embodiments of the bubble-based delivery system. All such embodiments have been shown in combination with the aforementioned metering embodiment. However, the embodiments shown in FIGS. 13 through 18 are capable of packetizing feed gas even if such feed gas is injected into the admixing chamber in continuous fashion (as happens with prior-art devices).

The embodiments shown in FIGS. 13 and 14 employ rerouting means for creating feed-gas bubbles. The rerouting means are directed at intercepting, diverting, and compartmentalizing traversing feed gas. Any device may be employed to accomplish such rerouting functions. To illustrate that point, the embodiment shown in FIG. 13 employs screen 8 (which can be contoured or finned to enhance rerouting effectiveness), while the embodiment shown in FIG. 14 employs duct 13. Both embodiments are effective at packetizing ascending feed gas. Such packetization is illustrated in FIGS. 13 and 14. Those drawings depict gas 7 entering screen 8 or duct 13 and exiting those devices in reduced fragments.

The embodiments shown in FIGS. 15 and 16 employ perturbation means for creating feed-gas bubbles. The purpose for employing perturbation means is to create waves that are capable of disrupting congregating feed gas. Any wave-creating device may be employed. In that regard, the embodiment shown in FIG. 15 employs rotary paddle 9, while the embodiment shown in FIG. 16 employs sound emitter 10. Rotary paddle 9 and sound emitter 10 are positioned in chemical 5. Both devices generate wave 11. Wave 11, in turn, perturbs gas 7, causing gas 7 to divide into bubbles when passing through wave 11.

Lastly, the embodiments shown in FIGS. 17 and 18 employ stream-dividing means for packetizing feed gas. The stream-dividing means are directed at enabling parallel gas injection. Any device may be employed to accomplish concurrent streaming. To that end, the embodiment shown in FIG. 17 employs multiple intake ports, while the embodiment shown in FIG. 18 employs an output-splitting device. In the latter embodiment, illustrated in FIG. 18, splitter 12 is connected to the discharge side of intake port 1. Both embodiments accomplish packetization by allowing parallel feed-gas streaming.

Whatever embodiments are employed, it is recommended that the bubble system produce the smallest gas packets possible. This recommendation is premised on the fact that smaller spheres feature greater aggregate surface area per given volume of fluid. The mathematical relationship between sphere volume and aggregate sphere area is illustrated by the table shown in FIGS. 10A, 10B, 100, 10D, and 10E. Although packetized gas bubbles will not be uniform spheres, the sizing and aggregate-area relationships remain valid for other geometrical shapes. Efforts should therefore be made to reduce bubble size and thereby maximize aggregate surface area of traversing feed gas, regardless of bubble geometry.

Subpart D

Advantages of Bubble System

The bubble-based delivery system features numerous advantages over prior art. The main advantage of the bubble system relates to increased surface area of chemical-traversing feed gas. Whereas conventional decarbonizing devices advance feed gas through free-standing chemical media in conical or cylindrical form, such as the device shown in FIG. 11 (Prior Art), the bubble-based delivery system effectuates packetized feed-gas streaming. Such packetization has the effect of increasing the surface area of chemical-traversing feed gas.

It goes without saying that surface area is an important metric in decarbonizing systems. Irrespective of the type of decarbonizing device involved, the surface area of exposed feed gas serves as an interface for absorption or adsorption. A positive correlation therefore exists between surface area and carbon-capturing efficiency. This principle Underlies the main advantage of the bubble system. Because greater surface area translates into greater gas-to-chemical exposure, the bubble system, through its packetization function, increases the efficiency of decarbonizing systems.

Such increases in efficiency are advantageous, to say the least. For one thing, more carbon dioxide can be scrubbed from feed gas. It will therefore be unnecessary to recycle feed gas through the admixing chamber for additional scrubbing. And because feed gas is scrubbed more completely (that is, more carbon dioxide is removed), processed feed gas is cleaner and can be safely vented. The upshot is that the bubble-based delivery system is environmentally friendly, results in greater carbon-dioxide sequestration, and will reduce operating expenses by obviating feed-gas recycling.

The bubble-based delivery system features other advantages in addition to those specified. For present purposes, however, it suffices to say that the bubble system overcomes numerous limitations in prior art, giving the bubble system superiority in relation to conventional devices.

Subpart E

Comments Regarding Both Systems

Two discrete but related packetization systems have been disclosed. One system enables the delivery of chemical fluid in droplet form. The other system, in contrast, enables the delivery of feed gas in bubble form. Multiple embodiments of the droplet and bubble systems were disclosed. All such embodiments are capable of effectuating the packetization function, either in the form of droplets or bubbles.

By studying the present disclosure, skilled artisans can implement the droplet and bubble systems according to the preferred embodiments of the invention. There are, of course, other embodiments of the disclosed systems. Such additional embodiments can be implemented within the scope of the invention, as broadly defined by the below claims.

Although the invention has been discussed in connection with decarbonizing devices, the droplet and bubble systems go beyond carbon-capturing purposes. This is because the admixing chamber may employ any type of chemical, including any chemical capable of binding to gases other than carbon dioxide. Moreover, feed gas may comprise any gaseous element, molecule, mixture, or substance. The disclosed systems, in short, apply to all gas-to-chemical interactions, not just to carbon-dioxide streams and carbon-binding chemicals.

Finally, it is noted that the disclosure and claims repeatedly refer to chemicals in general and chemical fluid or media in particular. Those terms are intended to be interpreted in the broadest possible sense. Accordingly, all chemical references shall encompass any liquid substance, including water. Such an inclusive chemical definition stems from knowledge that water is capable of binding miscellaneous gases, including carbon dioxide. Seawater, in fact, dissolves hundreds of billions of tons of carbon dioxide every year. It is therefore anticipated that practitioners will employ water and other liquid substances as gas-binding chemicals, which can certainly be done within the scope of the invention.

What is claimed is:

1. An apparatus for carbon dioxide capture from flue gas, other industrial gas containing carbon dioxide, and ambient air, comprising:
   a source of atomizable liquid comprising a chemical binding substance capable of releasably binding to carbon dioxide;
   an admixing chamber having an inlet and an outlet;
   flow inducing means for causing the gas or air to enter and leave the admixing chamber via said inlet and outlet respectively; and
   at least one atomizer for injecting droplets of the atomizable liquid into the admixing chamber while the gas or air is present therein, so that the droplets interact with and capture, carbon dioxide from gas or ambient air within the admixing chamber.

2. The apparatus according to claim 1, further comprising means for removing from the admixing chamber any of said liquid which settles to the bottom of the admixing chamber.

3. The apparatus according to claim 1, further comprising means for releasing the atomizable liquid from carbon dioxide to which the liquid has become bound within the admixing chamber.

4. The apparatus according to claim 1, wherein the droplets have volumes on the order of a microliter.

5. The apparatus according to claim 1, wherein the droplets have volumes on the order of a nanoliter.

6. The apparatus according to claim 1, wherein the flow inducing means comprises a source of gas pressure.

7. The apparatus according to claim 1, wherein the flow inducing means includes a source of vacuum.

8. The apparatus according to claim 1, comprising a plurality of atomizers for injecting said droplets throughout the admixing chamber.

* * * * *